(12) United States Patent
Thompson et al.

(10) Patent No.: US 7,426,827 B2
(45) Date of Patent: Sep. 23, 2008

(54) SUSPENSION ARRANGEMENT FOR A BOOM ASSEMBLY MOUNTED ON AN AGRICULTURAL SPRAYER

(75) Inventors: Dennis G. Thompson, Saskatoon (CA); Dennis W. Chahley, Martensville (CA)

(73) Assignee: CNH Canada, Ltd. (CA)

( * ) Notice: Subject to any disclaimer, the term of this patent is extended or adjusted under 35 U.S.C. 154(b) by 134 days.

(21) Appl. No.: 11/424,371

(22) Filed: Jun. 15, 2006

(65) Prior Publication Data
US 2007/0289298 A1 Dec. 20, 2007

(51) Int. Cl.
*F16D 31/02* (2006.01)
(52) U.S. Cl. .......................... 60/406; 239/164
(58) Field of Classification Search ............... 239/164; 60/406
See application file for complete search history.

(56) References Cited

U.S. PATENT DOCUMENTS

| | | | |
|---|---|---|---|
| 4,288,034 A | 9/1981 | Widmer et al. | |
| 4,372,492 A | 2/1983 | Blumenshine | |
| 4,394,968 A | 7/1983 | Tyler | |
| 5,335,856 A * | 8/1994 | Nathan | 239/164 |
| 5,887,390 A | 3/1999 | Schulz et al. | |
| 5,988,528 A | 11/1999 | Krohn et al. | |
| 5,992,759 A | 11/1999 | Patterson | |
| 6,053,419 A | 4/2000 | Krohn et al. | |
| 6,293,475 B1 | 9/2001 | Sobolik | |
| 6,315,218 B1 | 11/2001 | Guesdon | |
| 6,343,661 B1 | 2/2002 | Thompson et al. | |
| 6,776,356 B2 | 8/2004 | Maliteare | |
| 6,834,223 B2 | 12/2004 | Strelioff et al. | |
| 2006/0118654 A1 * | 6/2006 | Shivak | 239/166 |

* cited by examiner

*Primary Examiner*—F. Daniel Lopez
(74) *Attorney, Agent, or Firm*—Rebecca Henkel (57) ABSTRACT

A system for reducing oscillating movement of a boom assembly about a fore-and-aft aligned axis defined by a pivotal connection of a suspension arrangement independent of a carrier frame is provided. The system includes an accumulator, a cylinder actuator mechanically interconnected between the carrier frame and the boom assembly, and a metered orifice connected in fluid communication to restrict a fluid flow between the accumulator and the cylinder actuator. In response to rotation of the boom assembly in a first direction relative to the carrier frame, the system creates a force resisting the rotation of the boom assembly in the first direction. Thereby, the system deadens oscillating pivotal movement of the boom assembly relative to the carrier frame and exerts a biasing force to assist in returning and/or maintaining the boom assembly at a generally horizontal alignment.

18 Claims, 5 Drawing Sheets

SUSPENSION ARRANGEMENT FOR A BOOM ASSEMBLY MOUNTED ON AN AGRICULTURAL SPRAYER

CROSS-REFERENCE TO RELATED APPLICATIONS

This application is related to U.S. application entitled "System For and Method of Locking a Roll Suspension Arrangement For a Boom Assembly Mounted on an Agricultural Sprayer," filed simultaneously with this application and hereby incorporated herein by reference in its entirety.

BACKGROUND OF THE INVENTION

1. Field of the Invention

The invention relates to an agricultural sprayer with a boom assembly, and more specifically, relates to a roll suspension arrangement in combination or including a system configured to reduce undesired oscillating movement of the boom assembly.

2. Description of the Related Art

Boom assemblies are commonly used on agricultural vehicles or self-propelled implements, such as sprayers or planters, to dispense seed, fertilizer, insecticide, herbicide, etc. and other miscellaneous agricultural materials. A typical boom assembly includes a pair of booms configured to pivot or fold between operative and inoperative positions relative to the boom support vehicle. In the operative position, the booms commonly extend in a laterally outward direction from the boom support vehicle such that the agricultural applicator covers a large surface area with each pass across a field. The weight of the boom assembly generally correlates with its operative length.

Upon completing distribution of the agricultural materials to the field, the booms are generally swung, pivoted or folded in a forwardly or rearwardly direction to a folded, inoperative position. The preferred folded, inoperative position of the booms are generally parallel to the direction of travel of the support vehicle such that the boom assembly and support vehicle have a narrow profile for transport from the field and on a roadway. Folding or swinging the booms is typically performed manually or by a hydraulic or pneumatic system mounted between the booms and the boom support vehicle. Before transport, the booms are generally seated in or on a boom cradle or saddle structure such that the boom assemblies are supported for travel on the roadway.

To accommodate the requirement for wider booms, manufacturers have developed a suspension arrangement for the boom assembly that is operable to reduce miscellaneous stresses imposed on the booms, the support framework, and/or the boom vehicles that are associated operation in the field. In addition, the suspension arrangement is designed to maintain a uniform distance or parallel altitude between the booms and the ground to maintain ideal spray coverage. A certain known "roll-suspension" arrangement includes a single pivot connection operatively connected between the boom assembly and the carrying or stationary frame in a manner that allows the boom to swing in a pendulum-like manner that is independent of the stationary frame. The addition of mechanical-type tools such as springs and/or rubber-composition shocks and/or gas-charged shocks are beneficial in damping or reducing oscillating movement of booms relative to the boom-support implement and/or vehicle when operating in rough terrain.

However, known suspension arrangements employed to adjust a height of the boom assembly from ground have drawbacks. For example, known mechanical-type of suspension arrangements that solely employ springs and shock absorbers can be difficult to adjust, especially in the field. Also, known automatic suspension systems that use cylinder actuators to adjust a height of the boom assembly from the ground need fast reaction times. Otherwise, suspension arrangements that react too slowly will increase opportunities of instability of the boom assembly.

Therefore, there is a need or desire for a suspension arrangement operable to address the drawbacks described above. The damping system should also be configured to be utilized with a wide variety of boom supported implements and/or vehicles in addition to those related to agriculture.

SUMMARY OF THE INVENTION

The present invention provides a system in combination with or part of a suspension arrangement operatively connected between a boom assembly and a carrier frame supported on a boom support implement or vehicle that meets the desires and needs described above. The system of the present invention thus enhances operation of the suspension arrangement in regard to balance of a boom assembly, especially over rough terrain, as well as enhancing smooth transition in the folding of the boom assembly between the extended, operative position and the folded, inoperative position for transport.

In a first exemplary embodiment of the present invention, a suspension arrangement is operatively connected between the boom assembly and the carrier frame is provided. The boom assembly is pivotally supported by the suspension arrangement about a fore-and-aft axis independently of the carrier frame in support of the boom assembly from a wheeled frame assembly of the sprayer for travel in a forward direction. The sprayer includes a fluid drive system configured to move the boom assembly between an extended position for operation in a field and a folded, non-operative position relative to the wheeled frame assembly for transport. In combination with the suspension arrangement, the system includes an accumulator, a cylinder actuator mechanically interconnected between the carrier frame and the boom assembly, and a metered orifice connected in fluid communication to restrict a fluid flow between the accumulator and the cylinder actuator. The system automatically creates a force resisting rotation of the boom assembly relative to the carrier frame. Thereby, the system reduces oscillating pivotal movement of the boom assembly about the relative to the carrier frame.

The exemplary embodiment of the system further includes a pressure reducing valve configured to maintain a predetermined fluid pressure at the actuator cylinder, as well as an accumulator discharge valve to relieve fluid pressure when a fluid drive source or pump is disengaged. The pressure reducing valve can be manually set or set automatically via a remote controller. The remote controller is located remote of the pressure reducing valve and configured to send a signal to the pressure reducing valve representative of a desired change in pressure at the cylinder actuator. In response to the signal, the pressure reducing valve adjusts the fluid pressure between the cylinder actuator and the accumulator. The preferred system further includes a check valve located to isolate fluid communication, as well as to maintain fluid pressure, between the accumulator and the actuator cylinder.

Each accumulator is pre-charged with gas pressure so as to provide an opposing force to the rotation of the respective boom about the pivot of the suspension arrangement. This spring force provided by each accumulator is adjustable by varying the pre-charged gas pressure of the accumulator. The suspension arrangement further includes an accumulator discharge valve connected in fluid communication with the accumulator in a manner so as to automatically "bleed off" or release pressurized fluid flow from the accumulator upon detecting, via a pilot line, a loss of pressurized fluid flow from the fluid drive source.

The exemplary cylinder actuator includes a first cylinder actuator and a second cylinder actuator each in parallel fluid connection as separated by check valves to the fluid drive source. The first cylinder actuator and the second cylinder actuator each are mechanically connected at the boom assembly at a lateral offset distance from the fore-and-aft axis. Rotation of the boom assembly about the fore-and-aft axis in a first direction from horizontal causes a fluid flow in a first flow direction from the cylinder actuator through the metered orifice and into the accumulator, and rotation of the boom assembly in a second direction, opposite the first direction, from horizontal causes a fluid flow in a second flow direction from the accumulator into the actuator cylinder. The fluid flow in the first flow direction through the metered orifice creates the force resisting the rotation of the boom assembly in the first direction, and the fluid flow in the second flow direction through the metered orifice creates the force resisting the rotation of the boom assembly in the second direction. The metered orifice is a needle valve or flow control valve having an orifice selectively adjustable in size, and adjustment of the size of the orifice adjusts the force resisting the rotation of the boom assembly.

The preferred embodiment of the system includes generally identical arrangements of a pressure reducing valve, check valve, accumulator, and accumulator discharge valve configured to operatively interact with the first and second cylinder actuators, respectively, so as to apply generally equal and opposing forces at the cylinder actuators in a manner that balances the generally horizontal alignment of the boom assembly about the suspension arrangement relative to the ground.

Another embodiment of the present invention is an agricultural sprayer having a boom assembly with a central frame structure in pivotal support of a first boom and a second boom, a lift linkage in combination with a carrier frame configured to move the boom assembly between a lowered, operative position and a raised, inoperative position, a suspension arrangement in pivotal support of the boom assembly about a fore-and-aft axis independent of the carrier frame, and a system interconnected to reduce oscillating movement between the boom assembly and the carrier frame. The first and second booms each pivot about a vertical axis between an extended, operative position and a folded, inoperative position relative to the central frame structure. The system includes an accumulator, a cylinder actuator mechanically interconnected between the carrier frame and the boom assembly, and a metered orifice connected in fluid communication between the accumulator and the cylinder actuator. Fluid communication is isolated between the actuator cylinder, the accumulator, and a pressure regulating valve via a check valve. The metered orifice limits the flow of fluid therethrough, thereby reducing pivotal or oscillating movement of the boom assembly about the pivot connection of the suspension arrangement with respect to the carrier frame.

In accordance with yet another aspect of the invention, a method of damping rotation of a boom assembly about a suspension arrangement of an agricultural sprayer is provided, substantially in accordance with the foregoing summary.

Other objects, features, and advantages of the invention will become apparent to those skilled in the art from the following detailed description and accompanying drawings.

It should be understood, however, that the detailed description and specific examples, while indicating preferred embodiments of the present invention, are given by way of illustration and are not limiting. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE INVENTION

Figure 1:
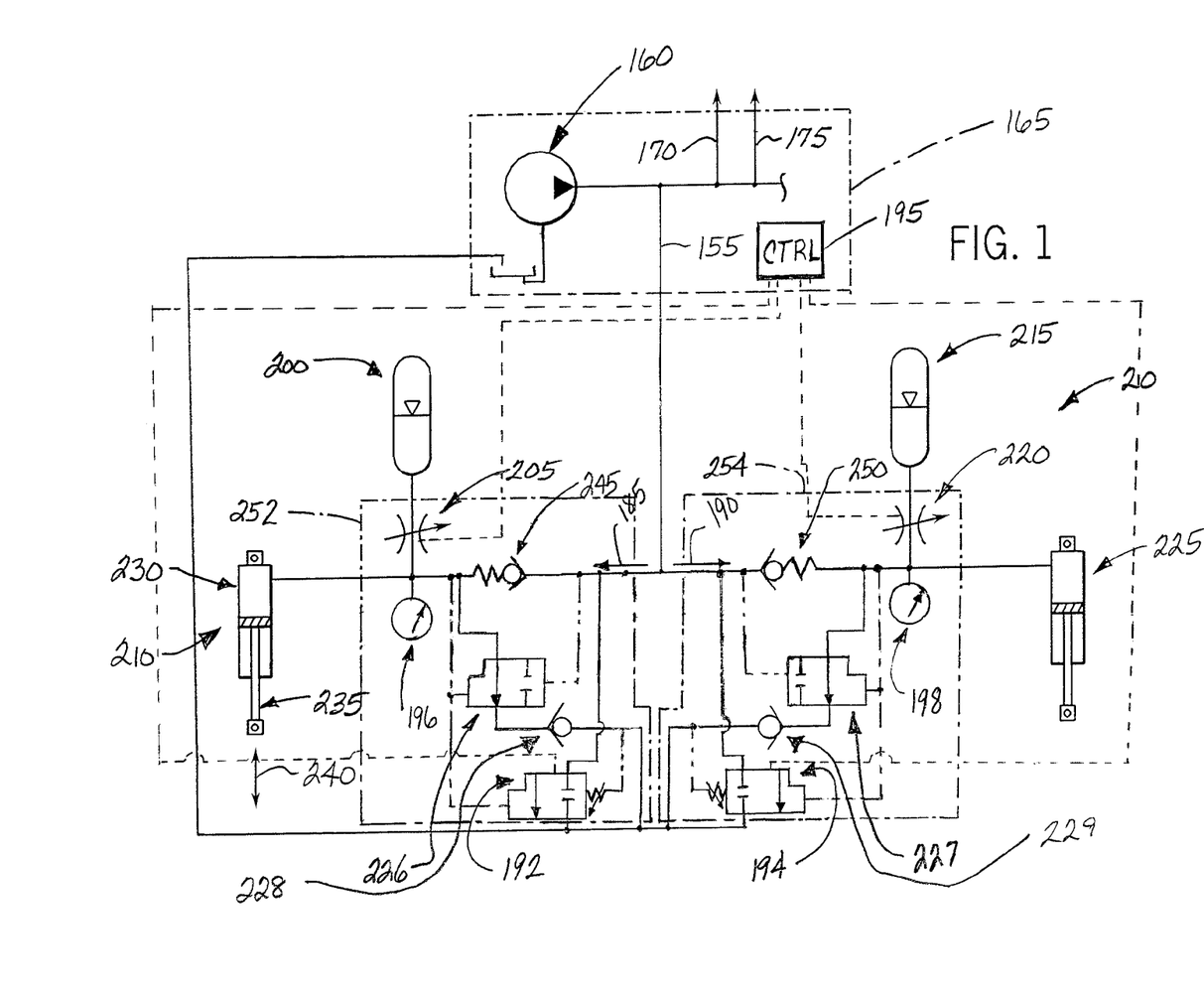
FIG. 1 illustrates a fluid circuit diagram of a system of the present invention.
Figure 5:
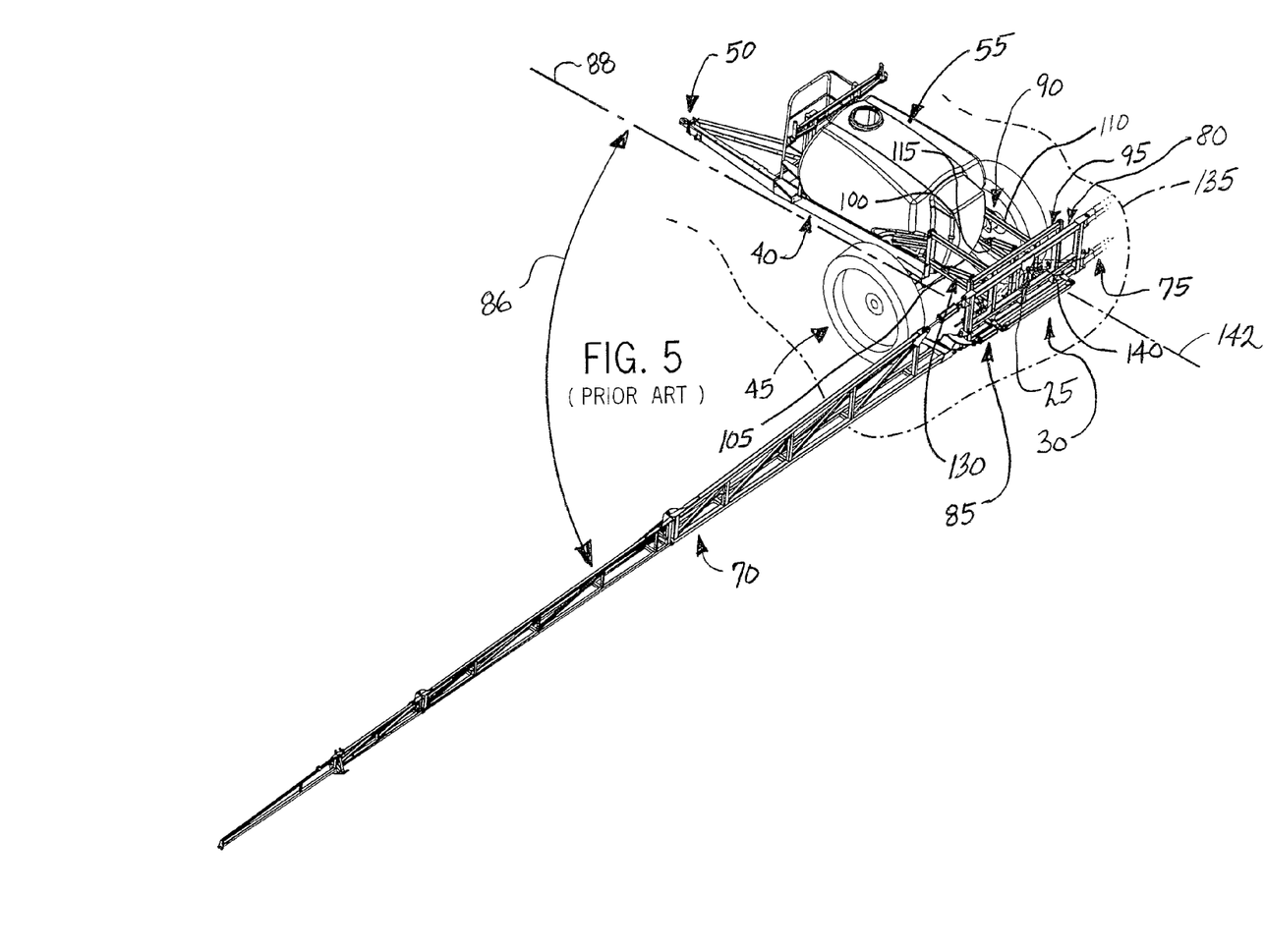
FIG. 5 illustrates a partial perspective view of a known agricultural sprayer in support of a boom assembly, the boom assembly in an extended, operative position.

FIG. 1 illustrates a system 20 in accordance with the present invention in combination with or part of a roll suspension arrangement 25, the system 20 generally configured to restrain or reduce undesired oscillating movement associated with operation of a "roll-suspension" arrangement 25 in pivotal support of a boom assembly 30 on a boom support implement 35 illustrated in FIG. 5.

Referring to FIG. 5, the exemplary boom support implement 35 is a conventional agricultural sprayer of a type commonly used to apply crop pesticides, nutrients or animal/human waste (sludge) to soils, typically before and after planting in the spring and/or after harvest in the fall. The boom support implement 35 generally includes a main frame 40 supported on plurality of oversized wheel assemblies 45 and a hitch 50 operable to be towed by a tow vehicle (not shown) across a field. The main frame 40 is generally configured in support of a reservoir or storage tank 55. With the booms assembly 30 in the extended, operative position (as illustrated in FIG. 5), agricultural product is communicated in a known manner from the reservoir 55 to a series of spray nozzles (not shown) for distribution across a wide surface area of the field.

Still referring specifically to FIG. 5, the boom assembly 30 generally includes a left boom 70 and a right boom 75, each mounted by the series of nozzles in fluid connection with the reservoir 55. The boom assembly 30 further includes a central frame 80 in pivotal support of the left and right booms 70 and 75. The left and right booms 70 and 75 each are pivotable by a pivot actuator mechanism(s) 85 about a generally vertical axis in a known manner so as to move (as illustrated by arrow and reference 86) the booms 70 and 75 in a generally horizontal direction between the extended, operative position (see FIG. 5) and the folded, inoperative position (illustrated in dashed line and by reference 88 also in FIG. 5). The exemplary pivot actuator mechanism 85 is a conventional hydraulic-driven mechanism. Yet it is understood that other types of actuator mechanism 85 (e.g., pneumatic-driven, electrical-driven, etc.) can be used.

The central frame 80 of the boom assembly 30 is coupled to a lift linkage assembly 90 by a carrier frame 95. The carrier frame 95 is generally a conventional frame structure coupled in support of the boom assembly 30 at the lift linkage assembly 90 (See FIG. 5). The lift linkage assembly 90 is generally operable to move the carrier frame 95 and attached boom assembly 30 between a lowered, operative position (FIG. 6) and a raised, inoperative position (not shown). The exemplary lift linkage assembly 90 generally includes an upper left linkage 100 and a lower left linkage 105, and an upper right linkage 110 (See FIG. 2) and lower right linkage 115. One end of each of the upper and lower left linkages 100 and 105 and the upper and lower right linkages 110 and 115 is pivotally attached at the carrier frame 95 so as to rotate about a horizontal axis. The other end of the each of the upper and lower left linkages 100 and 105 and the upper and lower right linkages 110 and 115 is pivotally attached at the main frame 40 so as to rotate about a horizontal axis.

Still referring specifically to FIG. 5, a conventional lift actuator mechanism(s) 130 (e.g., hydraulic cylinder, pneumatic cylinder, etc.) is configured to drive or cause the lift linkage 90 to move the carrier frame 95 and supported boom assembly 30 in a generally vertical direction between the lowered, operative position (See FIG. 5) and the raised, inoperative position (not shown). Once the lift linkage 90 has moved the boom assembly 30 upwardly in the vertical direction to the raised, inoperative position, the conventional pivot actuator mechanism 85 is operable to move the boom assembly 30 in a horizontal direction to the folded, inoperative position (illustrated in phantom line in FIG. 5) for transport.

Referring now to FIGS. 2-5, the "roll" suspension arrangement 25 operatively connects the carrier frame 95 and the boom assembly 30 such that the boom assembly 30 is operable to roll or rotate independent of the carrier frame 95 and lift linkage 90. Thereby, the suspension arrangement 25 is generally operable in a conventional manner to maintain a uniform distance or parallel altitude between the booms 70 and 75 of the boom assembly 30 and the ground 135. The conventional suspension arrangement 25 includes a generally central pivot connection 140 connected between the central frame 80 of the boom assembly 30 and the carrier frame 95. The pivot connection 140 defines a generally horizontal, fore-and-aft aligned axis 142 (See FIG. 5) about which the boom assembly 30 swings in a pendulum-type manner independently of the carrier frame 95.

FIGS. 1 and 2-4 illustrate the system 20 of the invention in combination with or part of the suspension arrangement 25 so as to restrain or reduce oscillating movement of the boom assembly 30 about the pivot connection 140 of the roll suspension arrangement 25 relative to the carrier frame 95 and lift linkage 90. The exemplary system 20 includes a first fluid line 155 connected to receive a pressurized fluid flow from a conventional fluid drive source 160 (see FIG. 1) located at a tow vehicle 165 (also illustrated in dashed line and by reference 165 in FIG. 1). In addition to connection to the system 20, the fluid drive source 160 (see FIG. 1) is connected in fluid communication via fluid line 170 to drive operation of the pivot actuator mechanisms 85 configured to move the booms 70 and 75 of the assembly 30 in the horizontal direction between folded and extended positions (illustrated in FIG. 5). The fluid drive source 160 (see FIG. 1) is further connected in fluid communication via third fluid line 175 to drive operation of the actuator mechanisms 130 so as to move the carrier frame 95 and boom assembly 30 between raised and lowered positions (illustrated in FIG. 5). The system 20 may further include one or more miscellaneous springs (not shown) and/or mechanical and/or gas-charged shocks (not shown) or the like configured to enhance isolation of vibration and miscellaneous forces from transmission between the boom assembly 30 and the carrier frame 95.

Referring specifically to FIG. 1, the fluid line 155 is in fluid communication with a left-hand circuit 185 connected in parallel to a right-hand circuit 190. The left-hand and right-hand circuits 185 and 190, respectively, are operatively configured to apply forces at opposed lateral distances from the pivot connection 140 so as to control oscillating movement of the boom assembly 30 about the suspension arrangement 25. The left-hand circuit 185 includes a pressure regulating valve 192, and right-hand circuit includes a pressure regulating valve 194. The pressure regulating valves 192 and 194 are selectively adjustable by an operator either manually at the valve or from a remote controller 195 located at the tow vehicle 165 so as to regulate a desired fluid pressure of the left-hand and right-hand circuits 185 and 190, respectively, of the system 20 in a manner so as to control a degree of restraint or resistance exerted by the system 20 so as to accommodate varying types of terrain. Generally equal set fluid pressures between the pressure regulating valves 192 and 194 causes generally equal and opposite forces on opposing sides of the boom assembly 30 so as to balance the boom assembly 30 at a generally horizontal alignment. For example, when operating in rough terrain, the operator may adjust the pressure regulating valves 192 and 194 so as to increase the fluid pressure of the left-hand and right-hand circuit 185 and 190, respectively, of the system 20 in a manner that increases resistance or restraint of oscillating movement of the boom assembly 30 about the pivot connection 140 of the suspension arrangement 25. When traveling over more smooth terrain, an operator may adjust the pressure regulating valves 192 and 194 so as to decrease the fluid pressure in the left-hand and right-hand circuits 185 and 190 of the system 20 in a manner that reduces resistance or restraint to movement of the boom assembly 30 about the pivot connection 140 of the suspension arrangement 25. Pressure sensors 196 and 198 are located to indicate a fluid pressure of the at the left-hand and right-hand circuits 185 and 190, respectively of the system 20 as controlled by the pressure regulating valves 192 and 194, respectively.

Although the following description is generally in reference to the left-hand circuit 185 in relation to the boom assembly 30 and the suspension arrangement 25, one skilled in the art would understood that the right-hand circuit 190 is of a similar construction and operates in similar manner with respect to the boom assembly 30 and suspension arrangement 25.

The left-hand circuit 185 includes an accumulator 200 connected in series with a metered orifice 205, which both are parallel connected in fluid communication with an cylinder actuator 210. The accumulator 200 is a conventional cylinder pre-charged to a pre-determined pressure with a fluid or gas that is different than the fluid flow through the system 20. The metered orifice 205 is located to adjustably restrict fluid flow between the accumulator 200 and the cylinder actuator 210. In a similar construction, the right hand circuit 190 includes an accumulator 215 is connected in series with a metered orifice 220, which both are parallel connected in fluid communication with an actuator 225. The preferred metered orifices 205 and 220 are needle valves. Yet, the metered orifices 205 and 220 can be a remotely controlled pulse-width modulated control valves or another type of control valves and is not limiting on the invention. The metered orifices 205 and 220 can be manually adjustable or remotely controlled from the remote controller 195 located at the tow vehicle 165.

The system 20 further includes an accumulator discharge valves 226 and 227 connected in fluid communication with the accumulators 200 and 215, respectively. The accumulator discharge valves 226 and 227*a* are each configured to automatically "bleed off" or release pressurized fluid flow from the respective accumulator 200 and 215 upon detecting a loss of pressurized fluid flow from the fluid drive source 160.

Figure 2:
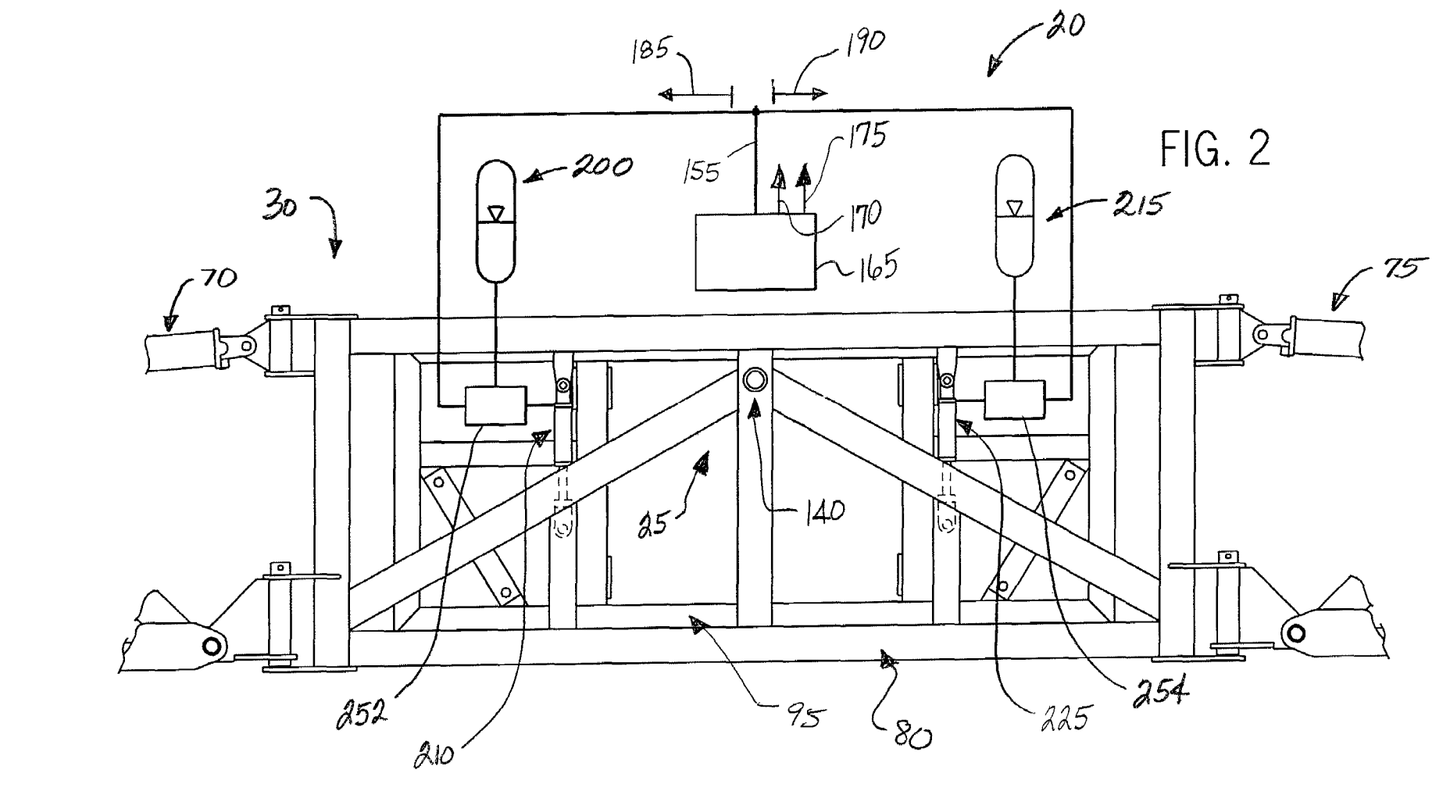
FIG. 2 illustrates a rearward elevation view of the system of the present invention in combination with or part of a roll suspension arrangement on an agricultural sprayer supporting a boom assembly, the boom assembly in an extended, operative position.
Figure 3:
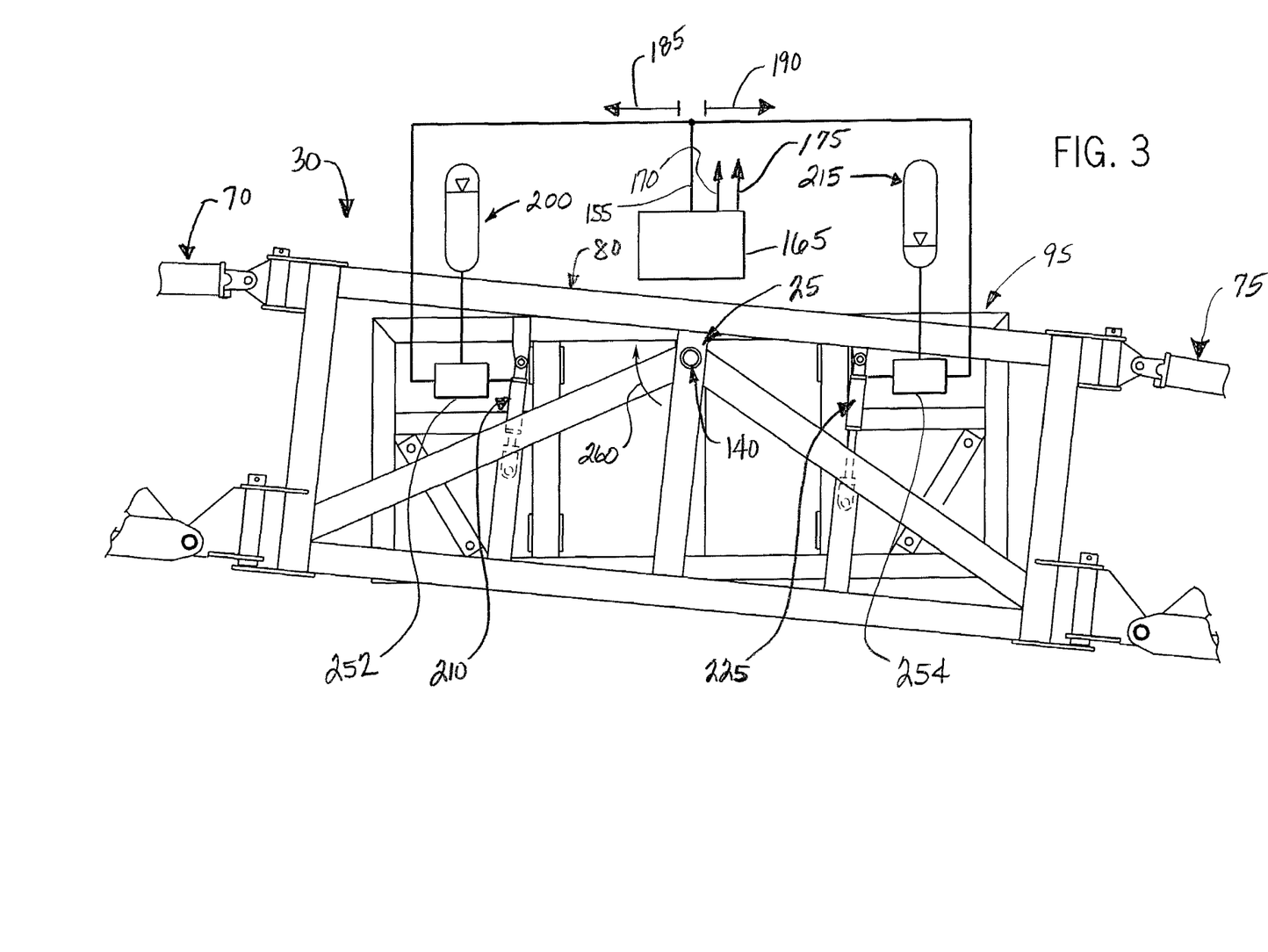
FIG. 3 illustrates a rearward side elevation view of the system of the invention in combination with or part of the roll suspension arrangement on the agricultural sprayer supporting the boom assembly of FIG. 2, the boom assembly in an extended, operative position rotated in a clockwise direction.
Figure 4:
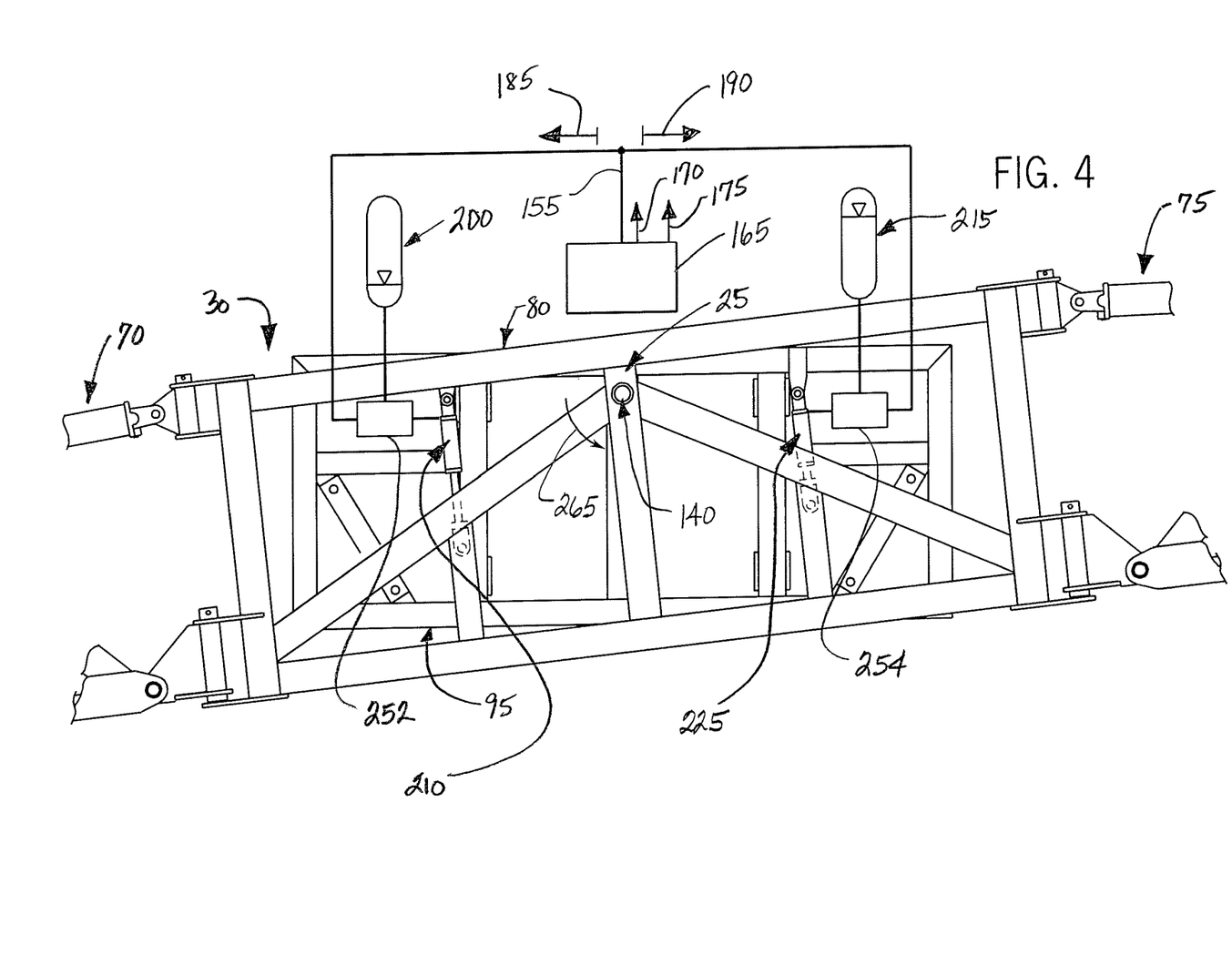
FIG. 4 illustrates a rearward side elevation view of the system of the invention in combination with or part of the roll suspension arrangement on the agricultural sprayer supporting the boom assembly of FIG. 2, the boom assembly in an extended, operative position rotated in a counter-clockwise direction.

As illustrated in FIG. 1, the left-hand cylinder actuator 210 is a linear-actuated cylinder that includes a cylinder portion 230 and a rod end 235 movable in a linear direction (illustrated by arrow and reference 240) with respect to the cylinder portion 230. As shown in FIGS. 2-4, the cylinder portion 230 of cylinder actuator 210 is connected at the carrier frame 95, and the rod end 235 is connected at the central frame 80 of the boom assembly 30. The left-hand cylinder actuator 210 is located laterally offset in a horizontal direction from the pivot connection 140 of the suspension arrangement 25, and the right-hand actuator 225 is located laterally offset in an opposite horizontal direction from the pivot connection 140 relative thereto. Alternatively, the fluid cylinder actuators 210 and 225 can be combined into a double-extendible rod actuator having a single cylinder portion operatively connectively to move spaced apart rods connected at opposite left-hand and right-hand lateral distances from the pivot connection 140.

Still referring specifically to FIG. 1, the left-hand circuit 185 also includes a check valve 245 located to prevent fluid flow from the left-hand circuit 185 to the right-hand circuit 190. As such, the check valve 245 restricts one-way fluid flow and maintains a selected fluid pressure, as selectively controlled by the pressure regulating valve 192, in fluid lines connecting the accumulator 200, the metered orifice 205, and the cylinder actuator 210. In a similar manner, the right-hand circuit 190 includes a check valve 250 that restricts one-way fluid flow and generally maintains the selected fluid pressure in fluid lines connected between the accumulator 215, the metered orifice 220, and the actuator 225. The exemplary check valves 245 and 250 are pilot-operated, and spring-biased toward a closed position. For sake of illustration, the combination of the pressure regulating valve 192, the pressure sensor 196, the metered orifice 205, the accumulator discharge valve 226, check valve 228, and the check valve 245 in FIG. 1 is shown by reference 252 in FIGS. 2-4. In a similar manner, the combination of the pressure regulating valve 194, the pressure sensor 198, the metered orifice 220, the accumulator discharge valve 227, the check valve 229, and check valve 250 in FIG. 1 is shown by reference 254 in FIGS. 2-4.

The pressure regulating valves 192 and 194 generally set at fluid pressure values so as to prevent the communication of a fluid flow from the drive source 160 at a pressure which would cause the cylinder actuators 210 and 225 to initiate movement of the boom assembly 30 about the pivot connection 140 of the suspension arrangement 25. Instead, the pressure regulating valves 192 and 194 are set at fluid pressure values such that the cylinder actuators 210 and 225 are free to react as sensors mechanisms operable to detect pivotal movement of the boom assembly 30 about the pivot connection 140 of the suspension arrangement 25.

In example and as illustrated in FIG. 2, assume that the lift linkage 90 holds the carrier frame 95 and attached booms 70 and 75 of the boom assembly 30 in a lowered, operative position (See FIG. 5) for spraying and distribution of product across the field. Also assume that the accumulators 200 and 215 are pre-charged to generally the same pressure, that the pressure regulating valves 192 and 194 are set at generally equal pressure settings, and that the terrain is generally level such that the boom assembly 30 and the carrier frame 95 are generally aligned with one another and horizontal aligned in parallel to the ground contour. Alternatively, the accumulators 200 and 215 can be pre-charged at different pressures relative to one another and/or the pressure-regulating valves 192 and 194 set at different pressure settings relative to one another in a manner that biases alignment of the boom assembly 30 at angle differing from general horizontal alignment in parallel with the carrier frame 95 and/or the ground contour. This embodiment may be desirable when operating the implement 35 along a side of a hill, for example.

Referring now to FIG. 3, assume that the implement 35 is traveling over a sloped-terrain such that miscellaneous gravitational forces cause the boom assembly 30 to rotate in a clockwise direction (illustrated by arrow and reference 260) about pivot connection 140 of the suspension arrangement 25 relative to the carrier frame 95. The clockwise rotation of the boom assembly 30 relative to the carrier frame 95 causes the cylinder actuator 210 to compress, forcing fluid from the cylinder portion 230 of the cylinder actuator 210 to the accumulator 200. The metered orifice 205 restricts the fluid flow into the accumulator 200, which translates to a linear force at the cylinder actuator 210 in a direction opposite to the compression of the cylinder actuator 210 that slows the pivotal movement of the boom assembly 30 relative to the carrier frame 95. Also, the pre-charged accumulators 200 and 215 exert typically equal and opposite centering forces on the actuators 225 and 230, and thereby resists the miscellaneous inertial forces associated with pendulum or rocking movement of the boom assembly 30 about the suspension arrangement 25 and causes the boom assembly 30 to self-center in a generally horizontal alignment parallel to the ground.

In a similar yet opposite manner, the clockwise rotation 260 of the boom assembly 30 causes extension of the actuator 225, creating a vacuum at the cylinder portion 230 which draws a fluid flow from the accumulator 215. The metered orifice 220 restricts the fluid flow leaving the accumulator 215, creating a force that resists and slows the clockwise pivotal rotation 260 of the boom assembly 30 about the suspension arrangement 25. If the boom assembly 30 oscillates or moves in an opposite direction about the pivot connection 140, the pressurized accumulator 215 exerts a damping force that resists the fluid flow leaving the actuator 225.

In accordance with the above description, the accumulators 200 and 215 of the system 20 absorb the miscellaneous inertial forces associated with causing pendulum- or rocking-type movement of the boom assembly 30 about the suspension arrangement 25, as well apply generally equal and opposite centering forces that bias the boom assembly 30 toward a self-center position in a horizontal alignment parallel to the carrier frame 95 and the ground.

FIG. 4 illustrates operation of the system 20 with counter-clockwise pivotal rotation (illustrated by arrow and reference 265) of the boom assembly 30 about the suspension arrangement 25 with respect to the carrier frame 95. The counter clockwise rotation 265 of the boom assembly 30 causes the cylinder actuator 210 to contract in a manner that forces fluid flow from the cylinder actuator 210 through the metered orifice 205 and into the accumulator 200. The counter-clockwise pivoting boom assembly 30 also causes the actuator 225 to extend, forcing fluid flow from the accumulator 215 through the metered orifice 220 to the actuator 225. The pre-charged accumulators 200 and 215 in combination with the metered orifices 205 and 220, respectively, slows the pivotal movement of the boom assembly 30 and furthermore dampens the oscillating pendulum movement of the boom assembly 30 about the suspension arrangement 25, in a similar manner as described above in regard to reaction of the system 20 to clockwise rotation of the boom assembly 30.

While the system 20 of the invention has been shown and described with respect to particular embodiments, it is understood that alternatives and modifications are possible and are contemplated as being within the scope of the present invention. For example, although the system 20 is described in reference to an agricultural sprayer, one skilled in the art will recognize that the present invention is not so limited. A wide variety of boom support implements 35 and/or vehicles could employ the system 20 of the invention. In addition, although a certain suspension arrangement 25 is described operatively connected between the carrier frame 95 and the boom assembly 30, it should be understood that the system 20 of the present invention can be employed to restrain a wide variety of suspension arrangements 25 and is not limiting on the invention.

Many changes and modifications could be made to the invention without departing from the spirit thereof. The scope of these changes will become apparent from the appended claims.

We claim:

1. A system connectable to a fluid drive source for providing pressurized fluid flow and configured to restrain oscillating movement associated with operation of a suspension arrangement for a boom assembly of an agricultural sprayer, the boom assembly pivotally supported by the suspension arrangement about a fore-and-aft axis independently of a carrier frame in support of the boom assembly from a wheeled frame assembly of the sprayer for travel in a forward direction, the sprayer including a fluid drive system configured to move the boom assembly between an extended position for operation in a field and a folded, non-operative position relative to the wheeled frame assembly, the system comprising:
   an accumulator;
   a cylinder actuator mechanically interconnected between the carrier frame and the boom assembly, the cylinder actuator in isolated fluid communication with the accumulator;
   a metered orifice connected in fluid communication to restrict a fluid flow between the accumulator and the cylinder actuator; and
   an actuator discharge valve configured to release a fluid supply from the accumulator in response to a loss of pressurized fluid flow from the fluid drive source;
   wherein the system automatically creates a force resisting rotation of the boom assembly about the suspension arrangement relative to the carrier frame.

2. The system as recited in claim 1, further comprising a pressure reducing valve configured to maintain a predetermined fluid pressure at the actuator cylinder.

3. The system as recited in claim 2, further comprising a controller configured to send a signal to the pressure reducing valve, wherein the pressure reducing valve adjusts a pressure of the fluid flow to the actuator cylinder in response to the signal from the controller.

4. The system as recited in claim 1, further comprising a check valve in fluid communication with the cylinder actuator and the accumulator.

5. The system as recited in claim 1, wherein the cylinder actuator includes a first cylinder actuator and a second cylinder actuator both in parallel fluid connection with their respective pressure regulating valves, the first cylinder actuator and the second cylinder actuator each mechanically connected at the boom assembly at a lateral offset distance from the fore-and-aft axis.

6. The system as recited in claim 1, wherein rotation of the boom assembly about the fore-and-aft axis in a first direction from horizontal causes a fluid flow in a first flow direction from the cylinder actuator through the metered orifice and into the accumulator, and wherein rotation of the boom assembly in a second direction, opposite the first direction, from horizontal causes a fluid flow in a second flow direction from the accumulator into the actuator cylinder, wherein the fluid flow in the first flow direction through the metered orifice creates the force resisting the rotation of the boom assembly in the first direction, and wherein the fluid flow in the second flow direction through the metered orifice creates the force resisting the rotation of the boom assembly in the second direction.

7. The system as recited in claim 1, wherein the metered orifice is selectively adjustable in resistance to fluid flow therethrough via a remote controller so as to adjust the force reducing oscillating movement of the boom assembly about the fore-and-aft axis of the suspension arrangement.

8. An agricultural sprayer, comprising:
   a boom assembly that includes a central frame structure in pivotal support of a first boom and a second boom, the first and second booms each pivotal about a vertical axis between an extended, operative position and a folded, inoperative position relative to the central frame structure;
   a lift linkage in combination with a carrier frame configured to move the boom assembly between a lowered, operative position and a raised, inoperative position; and
   a suspension arrangement in pivotal support of the boom assembly about a fore-and-aft axis independent of the carrier frame; and
   a system connectable to a fluid drive source for providing pressurized fluid flow and configured to restrain oscillating movement associated with operation of the suspension arrangement, the system including:
   an accumulator,
   a selectively metered orifice connected in fluid communication to restrict a fluid flow between the accumulator and the fluid drive system of the sprayer,
   a cylinder actuator mechanically interconnecting the carrier frame and the boom assembly and in fluid communication with the metered orifice; and
   an actuator discharge valve configured to release a fluid supply from the accumulator in response to a loss of pressurized fluid flow from the fluid drive source;
   wherein the system resists movement of the boom assembly about the suspension arrangement with respect to the carrier frame without interrupting operation of the suspension arrangement.

9. The agricultural sprayer as recited in claim 8, wherein the cylinder actuator is connected at the central frame structure of the boom assembly.

10. The agricultural sprayer as recited in claim 8, wherein the cylinder actuator includes a first rod member and wherein the agricultural sprayer includes a second cylinder actuator having a second rod member connected in a spaced relation to the first rod member at the boom assembly.

11. The agricultural sprayer as recited in claim 8, wherein the selected metered orifice is controlled by a controller located remotely from the metered orifice.

12. The agricultural sprayer as recited in claim 8, wherein rotation of the boom assembly about the fore-and-aft axis in a first direction from horizontal causes fluid flow from the cylinder actuator through the metered orifice and into the accumulator, and wherein rotation of the boom assembly in an opposite direction from horizontal causes fluid flow from the accumulator into the actuator cylinder.

13. The agricultural sprayer as recited in claim 8, wherein the system includes a first hydraulic circuit and a second hydraulic circuit both in parallel fluid communication with a fluid drive source, the first hydraulic circuit including the actuator cylinder in fluid communication with a first accumulator and a first meter orifice, and the second hydraulic circuit including a second cylinder actuator in fluid communication with a second accumulator and a second metered orifice, the first and second cylinder actuators located at an offset distance in a opposing lateral directions from the fore-and-aft axis of defined by the suspension arrangement.

14. A method of damping rotation of a boom assembly about a suspension arrangement of an agricultural sprayer, the method comprising the steps of:
   providing a carrier frame in support of the boom assembly from a wheeled frame assembly of the sprayer, the boom assembly configured to pivot about a fore-and-aft axis defined by the suspension arrangement independently of the carrier frame;
   rotating the boom assembly about the fore-and-aft axis in a first direction from horizontal;
   creating a force resistant to the rotating step in the first direction by causing a fluid flow in a first flow direction from a cylinder actuator through a metered orifice and into the accumulator simultaneously with the rotating step in the first direction;
   rotating the boom assembly in an second direction from horizontal, opposite the first direction, about the fore-and-aft axis define by the suspension arrangement;
   creating a force resistant to the rotating step in the second direction by causing a fluid flow in a second flow direction from the accumulator through the metered orifice and into the cylinder actuator simultaneously with the rotating step in the first direction;
   connecting a pressure reducing valve in fluid communication to control a fluid pressure between the cylinder actuator and a metered orifice; and
   configurating an accumulator discharge valve to release a fluid supply at the accumulator upon loss of pressure at the pressure regulating valve.

15. The method as recited in claim 14, further comprising the step of:
   selectively adjusting a fluid pressure at the cylinder actuator with a pressure reducing valve in fluid communication between the cylinder actuator and a fluid drive source.

16. The method as recited in claim 14, wherein the metered orifice is a needle valve, and the method further comprises the step of:
   adjusting the force resistant to the rotating step in both the first and second directions by selectively adjusting a size of an orifice of the needle valve.

17. An agricultural sprayer, comprising:
   a boom assembly that includes a central frame structure in pivotal support of a first boom and a second boom, the first and second booms each pivotal about a vertical axis between an extended, operative position and a folded, inoperative position relative to the central frame structure;
   a lift linkage in combination with a carrier frame configured to move the boom assembly between a lowered, operative position and a raised, inoperative position; and
   a suspension arrangement in pivotal support of the boom assembly about a fore-and-aft axis independent of the carrier frame; and
   a system configured to restrain oscillating movement associated with operation of the suspension arrangement, the system including:
      an accumulator,
      a selectively metered orifice connected in fluid communication to restrict a fluid flow between the accumulator and the fluid drive system of the sprayer,
      a cylinder actuator mechanically interconnected between the carrier frame and the boom assembly and in fluid communication with the needle valve,
      a pressure reducing valve connected in fluid communication to control a fluid pressure between the cylinder actuator and the metered orifice, and
      an accumulator discharge valve configured to release a fluid supply at the accumulator upon loss of pressure at the pressure regulating valve;
   wherein the system resists movement of the boom assembly about the suspension arrangement with respect to the carrier frame without interrupting operation of the suspension arrangement.

18. The agricultural sprayer as recited in claim 17, the system further comprising a controller located remote of the pressure reducing valve and configured to send a signal to the pressure reducing valve representative of a selected change in fluid pressure between the cylinder actuator and the metered orifice.

* * * * *